(12) United States Patent
McGee et al.

(10) Patent No.: US 11,868,114 B2
(45) Date of Patent: *Jan. 9, 2024

(54) TRANSITIONING BETWEEN MANNED CONTROL MODE AND UNMANNED CONTROL MODE BASED ON ASSIGNED PRIORITY

(71) Applicant: Caterpillar Inc., Peoria, IL (US)

(72) Inventors: Robert Jason McGee, Peoria, IL (US); Craig L. Koehrsen, East Peoria, IL (US); Paul D Lenzen, Peoria, IL (US); Clarence Matthew Glover, Edwards, IL (US); Kyle Hendricks, Saint Francis, MN (US); Joshua Struble, Chillicothe, IL (US); Justin Peters, Clayton, NC (US); Sangameshwar Sonth, Dunlap, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/059,766

(22) Filed: Nov. 29, 2022

(65) Prior Publication Data
US 2023/0092561 A1   Mar. 23, 2023

Related U.S. Application Data

(63) Continuation of application No. 16/947,480, filed on Aug. 3, 2020, now Pat. No. 11,513,498.

(51) Int. Cl.
*G05B 19/4155* (2006.01)
*H04L 67/12* (2022.01)

(52) U.S. Cl.
CPC .......... *G05B 19/4155* (2013.01); *H04L 67/12* (2013.01); *G05B 2219/31384* (2013.01)

(58) Field of Classification Search
CPC ...... G05B 19/4155; G05B 2219/31384; H04L 67/12
See application file for complete search history.

(56) References Cited

U.S. PATENT DOCUMENTS

| | | | |
|---|---|---|---|
| 9,919,717 B2 | 3/2018 | Takehara et al. | |
| 10,065,658 B2 | 9/2018 | Deligianni et al. | |
| 11,513,498 B2* | 11/2022 | McGee | H04L 67/125 |
| 2006/0089763 A1 | 4/2006 | Barrett | |
| 2008/0266051 A1 | 10/2008 | Taki | |
| 2009/0306835 A1 | 12/2009 | Ellermann et al. | |

(Continued)

FOREIGN PATENT DOCUMENTS

WO    2015/076735 A1    5/2015

*Primary Examiner* — Gary Collins
(74) *Attorney, Agent, or Firm* — Harrity & Harrity, LLP

(57) ABSTRACT

A controller may configure the machine to operate in a plurality of modes including a manned control mode, a remote control mode, and an autonomous control mode. The controller may receive a request to cause the machine to perform an action; and determine a requested mode of operation of the machine associated with the request. The requested mode of operation may be one of the plurality of modes. The controller may selectively deny the request or enable the machine to perform the action based on a priority assigned to a current mode of operation of the machine and a priority assigned to the requested mode of operation.

20 Claims, 3 Drawing Sheets

(56) References Cited

U.S. PATENT DOCUMENTS

| | | |
|---|---|---|
| 2014/0207535 A1 | 7/2014 | Stefan |
| 2015/0286194 A1 | 10/2015 | Michelon |
| 2018/0196426 A1 | 7/2018 | Kim |
| 2018/0251122 A1 | 9/2018 | Golston et al. |
| 2019/0061777 A1 | 2/2019 | Lin |
| 2020/0047773 A1 | 2/2020 | Akaba et al. |
| 2020/0239023 A1 | 7/2020 | Srinivasan |
| 2020/0257418 A1 | 8/2020 | Strandberg |
| 2021/0221434 A1 | 7/2021 | Liu |

\* cited by examiner

TRANSITIONING BETWEEN MANNED CONTROL MODE AND UNMANNED CONTROL MODE BASED ON ASSIGNED PRIORITY

RELATED APPLICATION

This application is a continuation of U.S. patent application Ser. No. 16/947,480, filed Aug. 3, 2020 (now U.S. Pat. No. 11,513,498), which is incorporated herein by reference in its entirety.

TECHNICAL FIELD

The present disclosure relates generally to enabling a machine to transition between a manned control mode and an unmanned control mode and, for example, to transitioning between a manned control mode and an unmanned control mode based on assigned priority.

BACKGROUND

A construction vehicle (e.g., a compactor or soil compactor) may be used for compacting material (e.g., freshly laid material) such as, for example, asphalt, soil, gravel, and/or other materials that can be compacted. The construction vehicle may include one or more rotatable drums that roll over the material and, as a result, compact the material. The construction vehicle may be operated by an operator (e.g., present inside a cabin of the construction vehicle) or operated autonomously (e.g., without the operator inside the cabin). Accordingly, the construction vehicle may transition between a manned mode of operation and an autonomous mode of operation. However, transitioning between the manned mode of operation and the autonomous mode of operation may be present some issues.

For example, the transition between the manned mode of operation to the autonomous mode of operation may not be appropriately coordinated. For example, the construction machine may transition to the autonomous mode of operation while the operator is operating the construction vehicle from the cabin. As a result, such transition may create a conflict with respect to the construction vehicle operating in the manned mode of operation or the autonomous mode of operation. Such conflict may cause undesirable effect on the operation of the construction vehicle and unexpected effect on the operation of the construction vehicle (e.g., operation unexpected by the operator of the construction vehicle).

A system and method to make possible autonomous operation and/or external control of a motor vehicle is disclosed in International Publication No. WO2015076735A1 issued to Scania ("the '735 publication"). The '735 publication discloses a method to make possible autonomous operation and/or external control of a motor vehicle, which method is safe for the motor vehicle and safe for objects and people in its surroundings. The '735 publication further discloses a method to make possible autonomous operation and/or external control of a motor vehicle, whereby the method limits access to functions that are internal to the vehicle for external users.

While the '735 publication discloses a method to make possible autonomous operation and/or external control of a motor vehicle, the '735 publication does not disclose transition between a manned mode of operation to an autonomous mode of operation while preventing undesirable effect and unexpected effect on the operation of the construction vehicle.

The present disclosure solves one or more of the problems set forth above and/or other problems in the art.

SUMMARY

In some implementations, a method performed by a controller of a machine includes configuring the machine to operate in a plurality of modes including a manned control mode, a remote control mode, and an autonomous control mode; assigning a first priority to the manned control mode, a second priority to the remote control mode, and a third priority to the autonomous control mode, wherein the first priority is a higher priority than the second priority and the third priority; receiving a request to cause the machine to perform an action; determining, based on receiving the request, a current mode of operation of the machine, wherein the current mode of operation is one of the plurality of modes; determining a requested mode of operation of the machine associated with the request, wherein the requested mode of operation is one of the plurality of modes; and selectively denying the request or enabling the machine to perform the action based on a priority assigned to the current mode of operation and a priority assigned to the requested mode of operation, wherein the request is denied when the priority assigned to the current mode of operation is a higher priority than the priority assigned to the requested mode of operation, and wherein the machine is enabled to perform the action when the priority assigned to the requested mode of operation is a higher priority than the priority assigned to the current mode of operation.

In some implementations, a controller of a machine includes one or more memories; and one or more processors configured to: configure the machine to operate in a plurality of modes including a manned control mode, a remote control mode, and an autonomous control mode; receive a request to cause the machine to perform an action; determine a requested mode of operation of the machine associated with the request, wherein the requested mode of operation is one of the plurality of modes; and selectively deny the request or enable the machine to perform the action based on a priority assigned to a current mode of operation of the machine and a priority assigned to the requested mode of operation, wherein the request is denied when the priority assigned to the current mode of operation is a higher priority than the priority assigned to the requested mode of operation, and wherein the machine is enabled to perform the action when the priority assigned to the requested mode of operation is a higher priority than the priority assigned to the current mode of operation.

In some implementations, a machine includes a first controller associated with an autonomous control mode; a second controller associated with a remote control mode; a third controller configured to: receive a request to cause the machine to perform an action; determine a current mode of operation of the machine and a requested mode of operation of the machine associated with the request, wherein current mode of operation is one of a manned control mode, the remote control mode, or the autonomous control mode, and the requested mode of operation is another one of the manned control mode, the remote control mode, or the autonomous control mode; and selectively deny the request or enable the machine to perform the action based on a priority assigned to the current mode of operation of the machine and a priority assigned to the requested mode of operation, wherein the request is denied when the priority assigned to the current mode of operation is a higher priority than the priority assigned to the requested mode of operation, and wherein the machine is enabled to perform the action when the priority assigned to the requested mode of operation is a higher priority than the priority assigned to the current mode of operation.

DETAILED DESCRIPTION

This disclosure relates to a process relating to transitioning between a manned control mode, a remote control mode, an autonomous control mode based on priority assigned to the manned control mode, the remote control mode, the autonomous control mode. The process for transitioning between the manned control mode and the unmanned control mode has applicability to machines that are configured for manned control mode and unmanned control mode. The term "machine" may refer to any machine that performs an operation associated with an industry such as, for example, mining, construction, farming, transportation, or another type of industry. Moreover, one or more implements may be connected to the machine.

Figure 1:
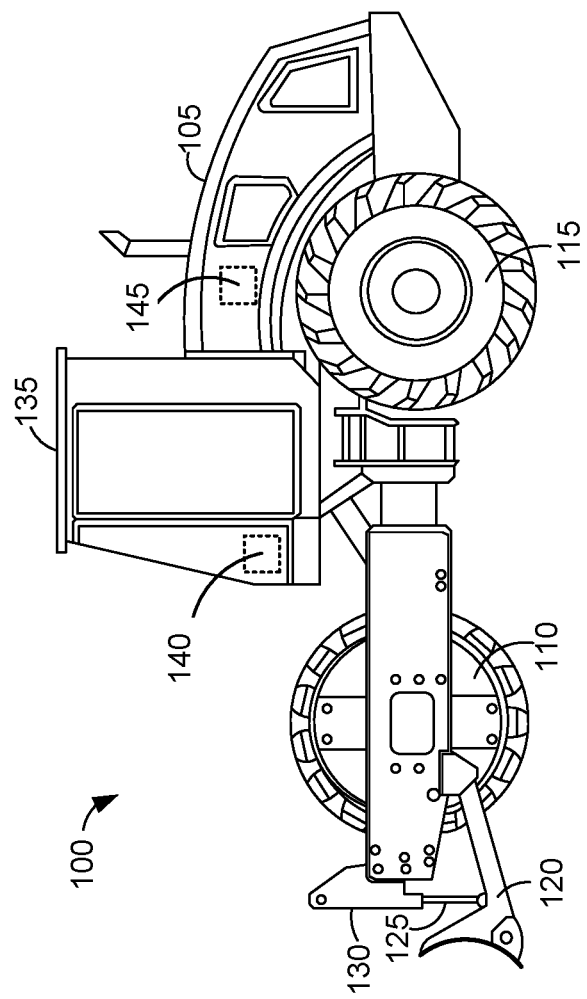
FIG. 1 is a diagram of an example machine described herein.

FIG. 1 is a diagram of an example machine 100 described herein. As shown in FIG. 1, the machine 100 is embodied as a compactor machine, such as a soil compactor. Alternatively, the machine 100 may be a dozer, an excavator, a mining truck, and/or the like.

As shown in FIG. 1, machine 100 includes a machine frame 105 and a cylindrical roller drum 110. Cylindrical roller drum 110 may be rotatably attached to machine frame 105. Machine 100 further includes a set of ground engaging members 115, such as wheels (as shown in FIG. 1), tracks, rollers, and/or the like, for propelling machine 100. As shown in FIG. 1, machine 100 further includes an implement, such as, for example, a plow blade 120. Plow blade 120 may be pivotally attached to machine frame 105. Machine 100 further includes a hydraulic cylinder 125 that is mounted to plow blade 120 to raise and lower plow blade 120. As shown in FIG. 1, hydraulic cylinder 125 is mounted to a blade cylinder mount 130 that is mounted to machine frame 105.

As shown in FIG. 1, machine 100 further includes an operator cabin 135. Operator cabin 135 may include cabin controls 140. Cabin controls 140 may include one or more devices (not shown in FIG. 1) for controlling and/or monitoring operations of machine 100. Machine 100 further includes a controller 145, such as, for example, an electronic control module (ECM). Controller 145 may include one or more memories and one or more processors and may enable machine 100 to transition between a manned control mode, a remote control mode, and an autonomous control mode.

The manned control mode may correspond to a mode of operation during which machine 100 is operated by an operator inside operator cabin 135. The remote control mode may correspond to a mode of operation during which machine 100 is operated from a remote location by an operator. The autonomous control mode may correspond to a mode of operation during which machine 100 is operating autonomously (e.g., without an operator). Cabin controls 140 and controller 145 are discussed in more detail in connection with FIG. 2.

While machine 100 is illustrated with operator cabin 135, the present disclosure may be applicable to a machine that does not include an operator cabin. In such instances, the manned control mode may be eliminated and the machine may transition between the remote control mode and the autonomous control mode.

As indicated above, FIG. 1 is provided as an example. Other examples may differ from what was described in connection with FIG. 1.

Figure 2:
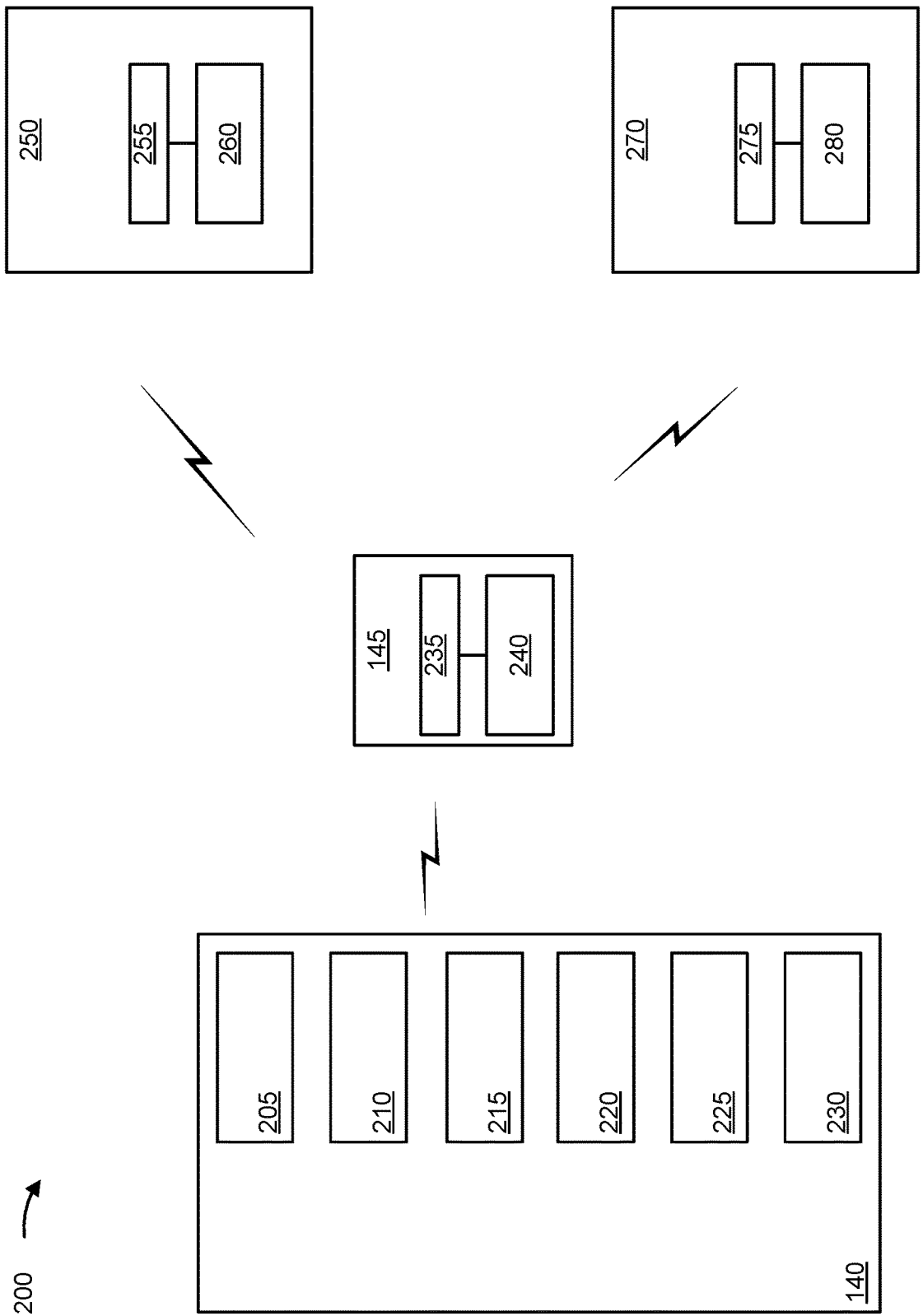
FIG. 2 is a diagram of an example system, described herein, that may be implemented in association with the machine of FIG. 1.

FIG. 2 is a diagram of an example system, described herein, that may be implemented in association with the machine of FIG. 1. As shown in FIG. 2, system 200 of FIG. 2 includes cabin controls 140, controller 145, autonomous system controller 250, and remote control system controller 270. As explained above, cabin controls 140 may include one or more devices for controlling and/or monitoring operations of machine 100. For example, cabin controls 140 may include a sensor device 205, a steering control 210, implement control 215, brake control 220, propulsion control 225, and manned/unmanned mode control 230.

Sensor device 205 may include a device that detects the presence of an operator inside operator cabin 135 and that transmits (e.g., to controller 145) sensor data indicating whether an operator is present in operator cabin 135. For example, sensor device 205 may include a seat sensor device that detects whether an operator is sitting on a seat of operator cabin 135. Steering control 210 may include one or more buttons, joysticks, levers, and/or the like used to steer machine 100 in one or more directions. Implement control 215 may include one or more buttons, joysticks, levers, and/or the like used to control an implement of machine 100 (e.g., plow blade 120).

Brake control 220 may include one or more buttons, levers, brakes (e.g., a parking brake), and/or the like used to reduce a speed of a movement of machine 100 and/or to cause a braking of machine 100. Propulsion control 225 may include one or more buttons, joysticks, levers, and/or the like used to cause propulsion of machine 100 (e.g., via ground engaging members 115). Manned/unmanned mode control 230 may include a button, a switch, and/or the like used to indicate whether machine 100 is enabled to transition from a manned control mode to an unmanned control mode (e.g., the autonomous control mode or the remote control mode). Cabin controls 140 may transmit requests (e.g., to controller 145) to cause machine 100 to perform actions associated with the manned control mode. In some instances, cabin controls 140 may include a controller (e.g., similar to controller 145) that may transmit the requests (e.g., to controller 145) to cause machine 100 to perform actions associated with the manned control mode.

Controller 145 may include one or more processors 235 (referred to herein individually as "processor 235," and collectively as "processors 235"), and one or more memories 240 (referred to herein individually as "memory 240," and collectively as "memories 240"). Processor 235 is implemented in hardware, firmware, and/or a combination of hardware and software. Processor 235 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. Processor 235 may include one or more processors capable of being programmed to perform a function.

Memory 240 includes a random-access memory (RAM), a read only memory (ROM), and/or another type of dynamic or static storage device (e.g., a flash memory, a magnetic memory, and/or an optical memory) that stores information and/or instructions for use by processor 235 to perform the function. For example, controller 145 (e.g., using processor 235 and memory 240) may enable machine 100 to transition between the manned control mode, the remote control mode, and the autonomous control mode based on input from cabin controls 140, autonomous system controller 250, and/or remote control system controller 270.

Autonomous system controller 250 may include one or more processors 255 (referred to herein individually as "processor 255," and collectively as "processors 255"), and one or more memories 260 (referred to herein individually as "memory 260," and collectively as "memories 260"). Processor 255 may be similar to processor 235 and memory 260 may be similar to memory 240. Autonomous system controller 250 may be part of an autonomous system of machine 100. The autonomous system may include one or more devices that enable machine 100 to operate in the autonomous control mode. Autonomous system controller 250 may transmit requests (e.g., to controller 145) to cause machine 100 to perform actions associated with the autonomous control mode.

Remote control system controller 270 may include one or more processors 275 (referred to herein individually as "processor 275," and collectively as "processors 275"), and one or more memories 280 (referred to herein individually as "memory 280," and collectively as "memories 280"). Processor 275 may be similar to processor 235 and memory 280 may be similar to memory 240. Remote control system controller 270 may be part of a remote control system of machine 100. The remote control system may include one or more devices that enable machine 100 to operate in the remote control mode. Remote control system controller 270 may transmit requests (e.g., to controller 145) to cause machine 100 to perform actions associated with the remote control mode.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
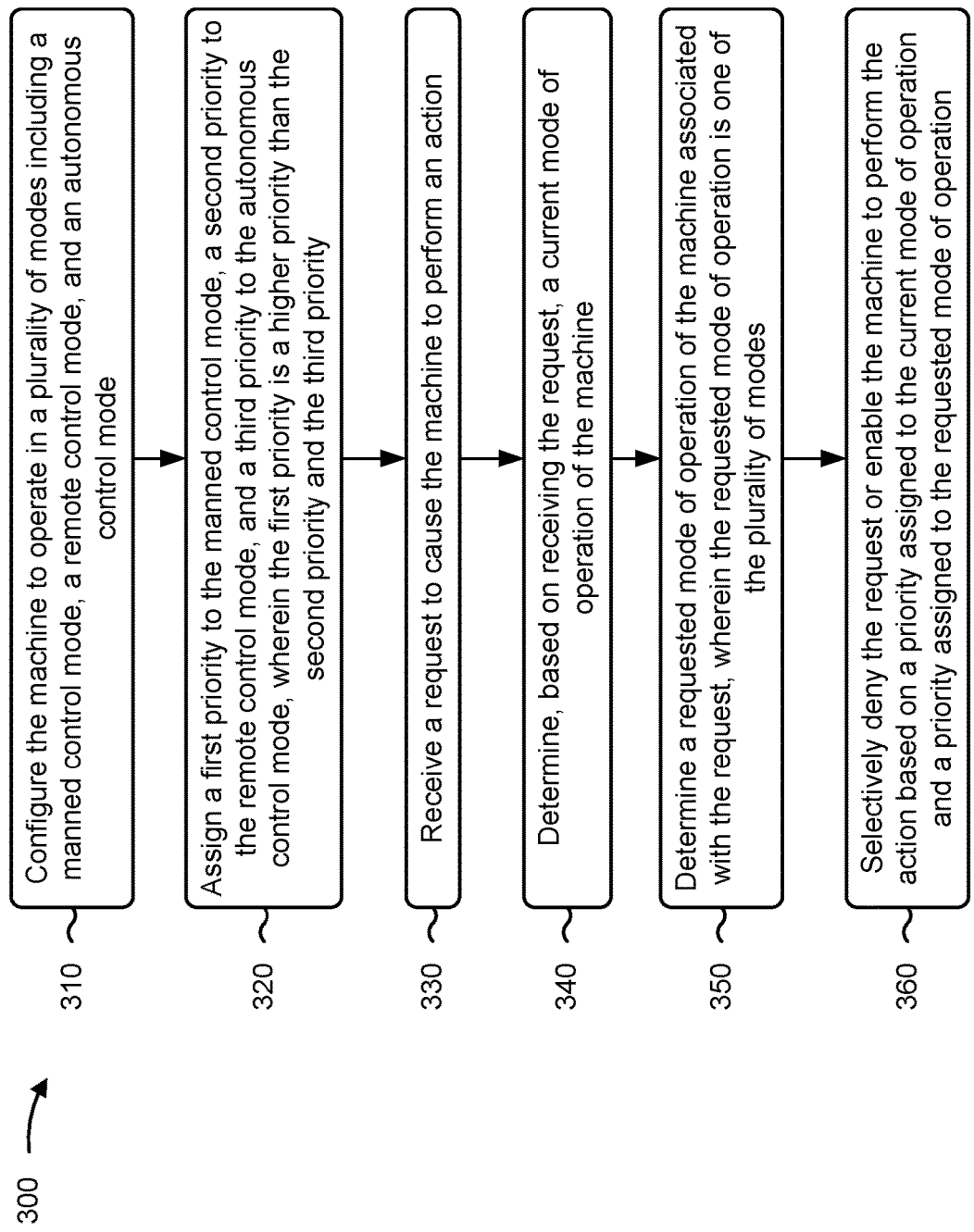
FIG. 3 is a flow chart of an example process relating to transitioning between a manned control mode and an unmanned control mode.

FIG. 3 is a flow chart of an example process 300 relating to transitioning between a manned control mode and an unmanned control mode. In some implementations, one or more process blocks of FIG. 3 may be performed by a controller (e.g., controller 145). In some implementations, one or more process blocks of FIG. 3 may be performed by another device or a group of devices separate from or including the controller, such as cabin controls (e.g., cabin controls 140), autonomous system controller (e.g., autonomous system controller 250), remote control system controller (e.g., remote control system controller 270), and/or the like.

As shown in FIG. 3, process 300 may include configuring the machine to operate in a plurality of modes including a manned control mode, a remote control mode, and an autonomous control mode (block 310). For example, the controller may configure the machine (e.g., machine 100) to operate in a plurality of modes including the manned control mode, the remote control mode, and the autonomous control mode, as described above. For instance, the controller may configure software and/or one or more components (of the machine) to enable the machine to operate in the manned control mode, the remote control mode, and/or the autonomous control mode.

As further shown in FIG. 3, process 300 may include assigning a first priority to the manned control mode, a second priority to the remote control mode, and a third priority to the autonomous control mode, wherein the first priority is a higher priority than the second priority and the third priority (block 320). For example, the controller may assign a first priority to the manned control mode, a second priority to the remote control mode, and a third priority to the autonomous control mode, as described above. In some examples, the first priority is a higher priority than the second priority and the third priority. Accordingly, the manned control mode may take precedence over the remote control mode and the autonomous control mode. The controller may assign the second priority and the third priority based on different factors (e.g., a type of task performed by the machine, an environment condition associated with the machine, an ability to communicate with the autonomous system controller or the remote control system controller, and/or the like). The controller may assign the second priority and the third priority based on one or more of the factors. The factors are provided merely as examples. Other examples may differ from what is described with respect to the factors.

For example, the controller may assign the second priority to the remote control mode and the third priority to the autonomous control mode based on a type of task performed by the machine. For instance, if the type of task is a first type that corresponds to a task that requires human intervention, the second priority assigned to the remote control mode may be higher than the third priority of the autonomous control mode. Types of tasks that require human intervention may include an excavation task, a bulldozing task, a road construction task, and/or the like. The types of tasks are provided merely as examples. Other examples may differ from what is described with respect to the types of tasks. If the type of task is a second type that corresponds to a task that does not require human intervention or a task performed more efficiently without human intervention, the third priority assigned to the autonomous control mode may be higher than the second priority assigned to the remote control mode.

In some examples, the request may include information identifying the type of task performed. Accordingly, the controller may determine the type of task based on the information included in the request. In some examples, information identifying the type of task performed may be stored in a memory of the machine (e.g., before the machine performs the task). Accordingly, the controller may determine the type of task based on the information (identifying the type of task performed) stored in the memory of the machine.

The controller may assign the second priority to the remote control mode and the third priority to the autonomous control mode based on an environmental condition associated with the machine. Environmental conditions may include weather (e.g., sunny, raining, snowing, sleeting, and/or the like), terrain (e.g., gravel, rocky, grass, ice, snow, pavement, dirt, flat, uphill, downhill, and/or the like), air quality (e.g., smoke, carbon monoxide, smog, and/or the like). The environmental conditions are provided merely as examples. Other examples may differ from what is described with respect to the environmental conditions. For example, the controller may determine the environmental condition (or a combination of environmental conditions) and assign the second priority and the third priority based on the environmental condition (or the combination of environmental conditions).

The controller may determine the environmental condition (or the combination of environmental conditions) using one or more sensor devices such as, for example, an electromagnetic spectrum sensor (e.g., visual spectrum, infrared, or near infrared cameras, radar systems, etc.), a biological sensor, a temperature sensor, a chemical sensor, and/or the like. For instance, if the environmental condition reduces a visibility surrounding the machine, the third priority assigned to the autonomous control mode may be higher than the second priority assigned to the remote control mode (e.g., because a line of sight of a remote operator may be diminished due to the reduced visibility and/or because the machine may include one or more devices that facilitate object detection when visibility is reduced). If the environmental condition negatively affects road conditions, the third priority assigned to the autonomous control mode may be higher than the second priority assigned to the remote control mode (e.g., because the machine may include one or more devices that facilitate detection of road conditions and dynamically adjust the operation of the machine to facilitate navigation of undesirable road conditions).

The controller may assign the second priority to the remote control mode and the third priority to the autonomous control mode based on an ability to communicate with an unmanned mode controller (e.g., the autonomous system controller and the remote control system controller) after receiving a request from the unmanned mode controller. For example, the controller may determine the ability to communicate and assign the second priority and the third priority based on the ability to communicate. For instance, if the controller detects an inability to communicate with the unmanned mode controller after receiving the request, the controller may assign a priority (to the unmanned mode controller) that is lowest out of the first priority, the second priority, and the third priority.

The controller may detect the inability to communicate with the unmanned controller if the controller does not receive any data from the unmanned controller within a threshold amount of time from receiving a request from the unmanned controller or within a threshold amount of time from transmitting a request to the unmanned controller. In some instances, the inability to communicate may be caused by a reduced signal strength associated with the communication.

As further shown in FIG. 3, process 300 may include receiving a request to cause the machine to perform an action (block 330). For example, the controller may receive a request to cause the machine to perform an action associated with the manned control mode. The controller may receive the request from the cabin controls, the autonomous system controller, or the remote control system controller. For instance, the controller may receive a steering command from steering control 210, an implement command from implement control 215, a braking command from brake control 220, a propulsion command from propulsion control 225, and/or the like associated with the cabin controls. Alternatively, the controller may receive a request, from the autonomous system controller, to cause the machine to perform an action associated with the autonomous control mode. Alternatively, the controller may receive a request, from the remote control system controller, to cause the machine to perform an action associated with the remote control mode. For example, the request may be based on input from a remote station of an operator that is remote with respect to the machine.

As further shown in FIG. 3, process 300 may include determining, based on receiving the request, a current mode of operation of the machine, wherein the current mode of operation is one of the plurality of modes (block 340). For example, the controller may determine a current mode of operation of the machine after receiving the request, as described above. In some implementations, the current mode of operation is one of the plurality of modes. For example, the controller may detect an input from the operator cabin of the machine (e.g., from cabin controls 140) and determine that the current mode of operation is the manned control mode based on detecting the input from the operator cabin of the machine. For instance, the controller may receive sensor data (e.g., from sensor device 205) indicating a presence of an operator in the operator cabin, detect a steering command from steering control 210, detect an implement command from implement control 215, detect a braking command from brake control 220, and/or detect a propulsion command from propulsion control 225.

Alternatively, the controller may detect that the autonomous system controller is actively causing the machine to perform a task and determine that the current mode of operation is the autonomous control mode based on detecting that the autonomous system controller is actively causing the machine to perform the task. Alternatively, the controller may detect that the remote control system controller is actively causing the machine to perform a task and determine that the current mode of operation is the remote control mode based on detecting that the remote control system controller is actively causing the machine to perform the task (e.g., based on one or more signals received from a device of an operator that is located remotely from the machine).

In some instances, the current mode of operation may correspond to a last mode of operation of the machine. For example, the last mode of operation may be a mode of operation determined by the controller within a threshold amount of time from receiving the request (e.g., prior to receiving the request). In some instances, the operator may set the current mode of operation (e.g., using manned/unmanned mode control 230) and may cause the controller to store information indicating the current mode of operation (e.g., in memory 240). Accordingly, the controller may determine the current mode of operation based on the information stored (e.g., in memory 240).

As further shown in FIG. 3, process 300 may include determining a requested mode of operation of the machine associated with the request, wherein the requested mode of operation is one of the plurality of modes (block 350). For example, the controller may determine a requested mode of operation of the machine associated with the request, as described above. The requested mode of operation is one of the plurality of modes. For example, the controller may detect an input from the operator cabin of the machine (e.g., from cabin controls 140) and determine that the requested mode of operation is the manned control mode based on detecting the input from the operator cabin of the machine.

Alternatively, the controller may receive the request from the autonomous system controller and determine that the current mode of operation is the autonomous control mode based on receiving the request from the autonomous system controller. Alternatively, the controller may receive the request from the remote control system controller and determine that the current mode of operation is the remote control mode based on receiving the request from the remote control system controller.

As further shown in FIG. 3, process 300 may include selectively denying the request or enabling the machine to perform the action based on a priority assigned to the current mode of operation and a priority assigned to the requested mode of operation (block 360). For example, the controller may selectively deny the request or enable the machine to perform the action based on a priority assigned to the current mode of operation and a priority assigned to the requested mode of operation, as described above. The request may be denied when the priority assigned to the current mode of operation is a higher priority than the priority assigned to the requested mode of operation. The machine may be enabled to perform the action when the priority assigned to the requested mode of operation is a higher priority than the priority assigned to the current mode of operation For example, if the requested mode of operation is the manned control mode, the controller may enable the machine to perform the action because the first priority assigned to the manned control mode is higher than the second priority assigned to the remote control mode and the third priority assigned to the autonomous control mode. If the current mode of operation is the manned control mode, the request may be denied because the first priority assigned to the manned control mode is higher than the second priority assigned to the remote control mode and the third priority assigned to the autonomous control mode. In some implementations, if the current mode of operation is the manned control mode, the controller may determine if an input has been detected from the operator cabin (e.g., an input from cabin controls 140) within a threshold amount of time after receiving the request.

If the controller determines that no input has been detected from the operator cabin (e.g., an input from cabin controls 140) within the threshold amount of time after receiving the request, the controller may determine that the machine can transition from the manned mode to the remote control mode or the autonomous control mode. The controller may determine whether one or more conditions are satisfied before enabling the machine to transition from the manned mode to the remote control mode or the autonomous control mode. The controller may deny the request if the one or more conditions are not satisfied and may enable the machine to perform the action if the one or more conditions are satisfied. For example, the controller may determine whether the remote control mode (if the request is received from the remote control system controller) has been disabled for the machine or whether the autonomous control mode (if the request is received from the autonomous system controller) has been disabled for the machine (e.g., disabled after the configuration performed by the controller as discussed in connection with block 310).

The controller may determine that the remote control mode or the autonomous control mode has been disabled if the controller determines that software and/or one or more components, to enable the remote control mode or the autonomous control mode, have been uninstalled from the machine, have been reconfigured for the machine, are experiencing a failure, and/or the like. The controller may determine that the remote control mode or the autonomous control mode has been disabled if the controller determines that software and/or one or more components of the machine prevent the machine from operating in the remote control mode or the autonomous control mode. The controller may determine that the remote control mode or the autonomous control mode has been disabled if the controller determines that manned/unmanned mode control 230 indicates that the machine is not enabled to transition to an unmanned control mode. The controller may determine that the one or more conditions are not satisfied based on determining that the remote control mode or the autonomous control mode is not enabled for the machine.

The controller may determine whether one or more conditions are satisfied based on determining whether an engine of the machine is running, an implement of the machine is in a lockout position (e.g., in a position that prevents movement of the implement), and/or a parking brake of the machine is engaged. The controller may determine that the one or more conditions are satisfied based on detecting that the engine of the machine is running, detecting that the implement of the machine is in the lockout position, and/or detecting that the parking brake of the machine is engaged.

If the requested mode of operation is the autonomous control mode, the controller may determine whether one or more conditions are satisfied based on determining whether the remote control system controller is simultaneously transmitting one or more requests to cause the machine to perform one or more actions (e.g., steering, braking, and/or propulsion). The controller may assign a priority to the one or more requests (associated with the remote control mode) that is higher than a priority assigned to another request (e.g., the request (associated with the autonomous control mode)). Therefore, the controller may determine that the one or more conditions are satisfied when the controller determines that the remote control system controller is not transmitting the one or more requests. Alternatively, the controller may determine that the one or more conditions are not satisfied when the controller determines that the remote control system controller is transmitting the one or more requests.

In some examples, by assigning priority to the manned control mode, the remote control mode, and the autonomous control mode, the process may reduce or eliminate potential conflicts associated with simultaneous requests received from the cabin controls (associated with the manned control mode), a remote control system controller (associated with the remote control mode), and/or an autonomous system controller (associated with the autonomous control mode). For example, the controller may enable the machine to perform an action associated with the request assigned a highest priority out of the priorities assigned to the requests and may deny the other requests.

In some examples, the controller may receive a first request from the autonomous system controller and a second request from the remote control system controller. If the current mode of operation is the manned mode and the controller enables the machine to transition from the manned mode (as discussed above), the controller may assign a priority to the first request and a priority to the second request in a manner similar to the manner described above in connection with block 320. The controller may enable the machine to perform an action associated with the first request and deny the second request if the priority assigned to the first request is a higher priority than the priority assigned to the second request. Alternatively, the controller may enable the machine to perform an action associated with the second request and deny the first request if the priority assigned to the second request is a higher priority than the priority assigned to the first request. Alternatively, the controller may enable the machine to perform the action associated with the first request during a first period of time and enable the machine to perform the action associated with the second request during a second period of time. Alternatively, the controller may enable the machine to perform the action associated with the first request in conjunction with the action associated with the second request, if the controller determines that the action associated with the first request may be performed in conjunction with the action associated with the second request without creating a conflict. For example, the controller may enable a remote operator to adjust a direction of the machine while the machine is engaging in an autonomous task.

In some examples, after enabling the machine to perform the action, the controller may determine whether the action has been performed within a threshold amount of time from receiving the request; and cause the machine to remain in the current mode of operation based on determining that the action has not been performed within the threshold amount of time.

In some examples, the controller may determine that the requested mode of operation is the remote control mode and determine that the current mode of operation is the autonomous control mode. When selectively denying the request or enabling the machine to perform the action, the controller may selectively deny the request or enable the machine to perform the action based on a priority assigned to the current mode of operation and a priority assigned to the requested mode of operation. The controller may deny the request if the priority assigned to the current mode of operation is a higher priority than the priority assigned to the requested mode of operation. Alternatively, the controller may enable the machine to perform the action if the priority assigned to the requested mode of operation is a higher priority than the priority assigned to the current mode of operation. In some instances, the controller may evaluate and reassign the priority on a periodic basis (e.g., every request, every work shift, every hour, every day, and/or the like).

In some examples, the controller may determine whether the action associated with the request is authorized. For example, the controller may store (e.g., in memory 240) a first list of authorized actions for the manned control mode, a second list of authorized actions for the autonomous control mode, and a third list of authorized actions for the remote control mode. The controller may compare the action associated with the request and a correspond list of the first list, the second list, and the third list and determine, based on the comparison, whether the action is authorized. When selectively denying the request or enabling the machine to perform the action, the controller may deny the request if the action is not authorized and enable the machine to perform the action if the action is authorized.

In some instances, the manned control mode, the remote control mode, and the autonomous control mode may be assigned priorities that are different than the priorities discussed above. For example, the first priority may be assigned to the remote control mode, the second priority may be assigned the autonomous control mode, and the third priority may be assigned to the manned control mode. Alternatively, the first priority may be assigned to the autonomous control mode, the second priority may be assigned to the remote control mode, and the third priority may be assigned to the manned control mode, and so on.

In some instances, the remote control mode and the autonomous control mode may be utilized while an operator is present in the operator cabin. In some examples, the operator may cause the machine to transition from the remote control mode or the autonomous control mode to the manned control mode to enable the operator to perform commissioning, debugging, or maintenance tasks. Additionally, or alternatively, the operator may cause the machine to transition from the remote control mode or the autonomous control mode to the manned control mode to enable the operator to complete a specific task while the operator is in the operator cabin. Additionally, or alternatively, the operator may cause the machine to transition from the remote control mode or the autonomous control mode to the manned control mode when the controller detects an input of the operator from the operator cabin (e.g., emergency braking, steering, and/or the like).

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

This disclosure relates to a process for transitioning between a manned control mode and an unmanned mode (e.g., a remote control mode or an autonomous control mode) based on a priority assigned to the manned control mode, the remote control mode, and the autonomous control mode. For example, a controller (e.g., controller 145) may assign a first priority to the manned control mode, a second priority to the remote control mode, and a third priority to the autonomous control mode.

Several advantages may be associated with the disclosed process for transitioning between the manned control mode and the unmanned mode. For example, by assigning the priority to the manned control mode, the remote control mode, and the autonomous control mode, the process may properly coordinate a transition between the manned control mode, the remote control mode, and the autonomous control mode and, accordingly, may improve such transition. By properly coordinating the transition between the manned control mode, the remote control mode, and the autonomous control mode, the process may reduce or eliminate potential conflicts associated with simultaneous requests received from cabin controls (associated with the manned control mode), a remote control system controller (associated with the remote control mode), and/or an autonomous system controller (associated with the autonomous control mode). Additionally, the process may reduce or eliminate undesirable effect and unexpected effect on the operation of the machine.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise.

What is claimed is:

1. A method performed by a controller of a machine, the method comprising:
   configuring the machine to operate in a plurality of modes including a remote control mode and an autonomous control mode;
   assigning a first priority to the remote control mode and a second priority to the autonomous control mode,
      wherein the first priority is a higher priority than the second priority;

receiving a request to cause the machine to perform an action;

determining, based on receiving the request, a current mode of operation of the machine,
  wherein the current mode of operation is one of the plurality of modes;

determining a requested mode of operation of the machine associated with the request,
  wherein the requested mode of operation is one of the plurality of modes; and selectively denying the request or enabling the machine to perform the action based on a priority assigned to the current mode of operation and a priority assigned to the requested mode of operation,
  wherein the request is denied when the priority assigned to the current mode of operation is a higher priority than the priority assigned to the requested mode of operation, and
  wherein the machine is enabled to perform the action when the priority assigned to the requested mode of operation is a higher priority than the priority assigned to the current mode of operation.

2. The method of claim 1, wherein determining the current mode of operation of the machine comprises:
  detecting input from a cabin of the machine; and
  determining the current mode of operation of the machine based on detecting the input from the cabin of the machine,
    wherein determining the requested mode of operation of the machine associated with the request comprises determining that the requested mode is one of the remote control mode or the autonomous control mode, and
    wherein selectively denying the request or enabling the machine to perform the action comprises denying the request based on determining the current mode of operation of the machine and based on determining that the requested mode is the one of the remote control mode or the autonomous control mode.

3. The method of claim 2, wherein detecting the input from the cabin of the machine comprises:
  receiving sensor data indicating a presence of an operator in the cabin.

4. The method of claim 1, wherein determining the requested mode of operation of the machine associated with the request comprises determining that the requested mode is one of the remote control mode or the autonomous control mode,
  wherein the method further comprises determining whether one or more conditions, associated with the one of the remote control mode or the autonomous control mode, are satisfied,
  wherein selectively denying the request or enabling the machine to perform the action comprises selectively denying the request or enabling the machine to perform the action further based on:
    determining that the requested mode is the one of the remote control mode or the autonomous control mode, and
    determining whether the one or more conditions are satisfied.

5. The method of claim 4, further comprising:
  determining that the one of the remote control mode or the autonomous control mode has been disabled; and
  determining that the one or more conditions are not satisfied based on determining that the one of the remote control mode or the autonomous control mode has been disabled,
    wherein selectively denying the request or enabling the machine to perform the action comprises denying the request based on:
      determining that the requested mode is the one of the remote control mode or the autonomous control mode, and
      determining that the one or more conditions are not satisfied.

6. The method of claim 5, wherein determining that the one of the remote control mode or the autonomous control mode is not enabled includes:
  determining that one or more components, to enable the one of the remote control mode or the autonomous control mode, are experiencing a failure.

7. The method of claim 5, wherein determining that the one of the remote control mode or the autonomous control mode is not enabled includes:
  determining that software, to enable the one of the remote control mode or the autonomous control mode, is experiencing a failure.

8. A controller of a machine, the controller comprising:
  one or more memories; and
  one or more processors configured to:
    configure the machine to operate in a plurality of modes including a remote control mode and an autonomous control mode;
    receive a request to cause the machine to perform an action;
    determine a requested mode of operation of the machine associated with the request,
      wherein the requested mode of operation is one of the plurality of modes; and
    selectively deny the request or enable the machine to perform the action based on a priority assigned to a current mode of operation of the machine and a priority assigned to the requested mode of operation,
      wherein the request is denied when the priority assigned to the current mode of operation is a higher priority than the priority assigned to the requested mode of operation, and
      wherein the machine is enabled to perform the action when the priority assigned to the requested mode of operation is a higher priority than the priority assigned to the current mode of operation.

9. The controller of claim 8, wherein, when determining the requested mode of operation, the one or more processors are configured to:
  detect an input from a cabin of the machine, and
  determine the requested mode of operation of the machine based on detecting the input from the cabin of the machine.

10. The controller of claim 9, wherein, when detecting the input from the cabin of the machine, the one or more processors are configured to at least one of:
  detect a steering command from the cabin of the machine,
  detect a propulsion command from the cabin of the machine,
  detect a braking command from the cabin of the machine, or
  detect an implement command from the cabin of the machine.

11. The controller of claim 8, wherein the one or more processors are further configured to:

assign a first priority to the remote control mode and a second priority to the autonomous control mode,
wherein the first priority is a higher priority than the second priority.

12. The controller of claim 8, wherein, when determining the requested mode of operation, the one or more processors are configured to determine that the requested mode of operation is the autonomous control mode, and
wherein, when selectively denying the request or enabling the machine to perform the action, the one or more processors are configured to:
determine that one or more conditions, associated with the autonomous control mode, are satisfied, and
enable the machine to perform the action based on determining that the one or more conditions, associated with the autonomous control mode, are satisfied.

13. The controller of claim 8,
wherein, when selectively denying the request or enabling the machine to perform the action, the one or more processors are configured to:
determine an environmental condition associated with the machine,
determine, based on the environmental condition, that the priority assigned to the current mode of operation is a higher priority than the priority assigned to the requested mode of operation, and
deny the request based on determining, based on the environmental condition, that the priority assigned to the current mode of operation is a higher priority than the priority assigned to the requested mode of operation.

14. A machine, comprising:
one or more processors configured to:
receive a request to cause the machine to perform an action;
determine a current mode of operation of the machine and a requested mode of operation of the machine associated with the request,
wherein the current mode of operation is one of a remote control mode or an autonomous control mode, and
wherein the requested mode of operation is another one of the remote control mode or the autonomous control mode; and
selectively deny the request or enable the machine to perform the action based on a priority assigned to the current mode of operation of the machine and a priority assigned to the requested mode of operation,
wherein the request is denied when the priority assigned to the current mode of operation is a higher priority than the priority assigned to the requested mode of operation, and
wherein the machine is enabled to perform the action when the priority assigned to the requested mode of operation is a higher priority than the priority assigned to the current mode of operation.

15. The machine of claim 14, wherein the one or more processors are further configured to:
assign a first priority to the remote control mode and a second priority to the autonomous control mode,
wherein the first priority is a higher priority than the second priority.

16. The machine of claim 15, wherein the one or more processors are further configured to:
assign a first priority to the remote control mode and a second priority to the autonomous control mode based on a type of task performed by the machine,
wherein the first priority of the remote control mode is higher than the second priority of the autonomous control mode when the type of task is a first type, and
wherein the second priority of the autonomous control mode is higher than the first priority of the remote control mode when the type of task is a second type.

17. The machine of claim 14, wherein, when determining the current mode of operation and the requested mode of operation, the one or more processors are configured to determine that the current mode of operation is one of the remote control mode or the autonomous control mode and determine that the requested mode of operation is another one of the remote control mode or the autonomous control mode, and
wherein, when selectively denying the request or enabling the machine to perform the action, the one or more processors are configured to:
determine that the priority assigned to the requested mode of operation is a higher priority than the priority assigned to the current mode of operation, and
enable the machine to perform the action based on determining that the priority assigned to the requested mode of operation is a higher priority than the priority assigned to the current mode of operation.

18. The machine of claim 14, wherein, when receiving the request, the one or more processors are configured to:
receive the request from a remote system controller.

19. The machine of claim 14, wherein the one or more processors are further configured to:
configure software to enable the machine to operate in the remote control mode and the autonomous control mode.

20. The machine of claim 14, wherein the remote control mode corresponds to a mode of operation during which the machine is operated from a remote location, and
wherein the autonomous control mode corresponds to a mode of operation during which machine is operating autonomously.

* * * * *